(12) United States Patent
Shibata

(10) Patent No.: US 6,695,558 B2
(45) Date of Patent: Feb. 24, 2004

(54) NAIL WITH LENGTH INDICATION

(75) Inventor: Harutoshi Shibata, Sakai (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 31 days.

(21) Appl. No.: 10/057,327

(22) Filed: Jan. 25, 2002

(65) Prior Publication Data

US 2002/0102148 A1 Aug. 1, 2002

(30) Foreign Application Priority Data

Jan. 31, 2001 (JP) .......................................... 2001-22554
Nov. 6, 2001 (JP) .......................................... 2001-340898

(51) Int. Cl.⁷ ............................ F16B 15/00; F16B 15/02
(52) U.S. Cl. ........................ 411/439; 411/13; 411/481; 411/92.3
(58) Field of Search .............................. 411/13, 14, 378, 411/439, 923, 481

(56) References Cited

U.S. PATENT DOCUMENTS

| 5,375,955 | A | * | 12/1994 | Leslie ........................ 411/378 |
| 5,511,917 | A | | 4/1996 | Dickson |
| 5,664,921 | A | * | 9/1997 | Leslie ........................ 411/378 |
| 6,073,552 | A | * | 6/2000 | Cruse et al. ............ 411/923 X |
| 6,095,739 | A | | 8/2000 | Albertson et al. |

FOREIGN PATENT DOCUMENTS

| JP | 07-027118 | 1/1995 |
| JP | 11-210727 | 8/1999 |

OTHER PUBLICATIONS

Max Ltd. Co. catalog entitled "Fastening", dated Nov., 1999.*

* cited by examiner

Primary Examiner—Neill Wilson
Assistant Examiner—Lorraine E. Walker
(74) Attorney, Agent, or Firm—John R. Benefiel

(57) ABSTRACT

Nails for use in construction have a length indication provided by numerical markings comprised of numerals formed by contouring on the nail head combined with a color coding as to nail length, by coloring recessed areas of the head to protect the coloring when the nail is being driven. The color coding and numeric length indication can be read either before or after the nail has been driven.

12 Claims, 4 Drawing Sheets

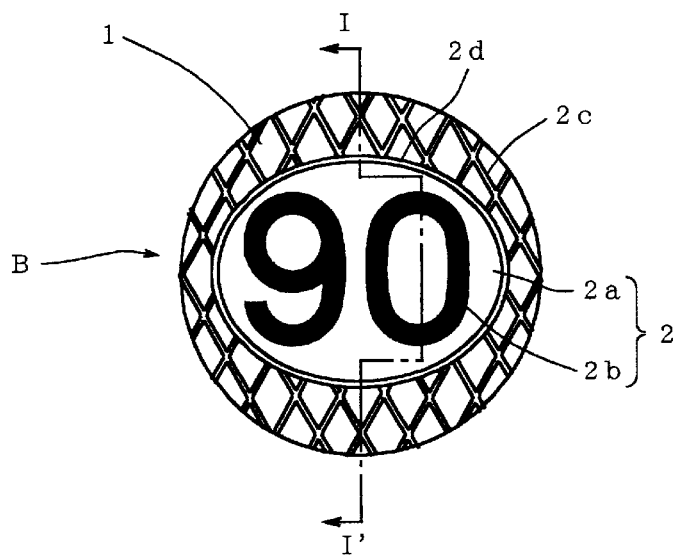
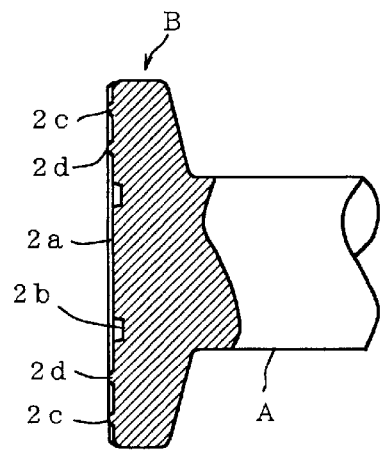
Fig. 1a　　　　　　　　Fig. 1b
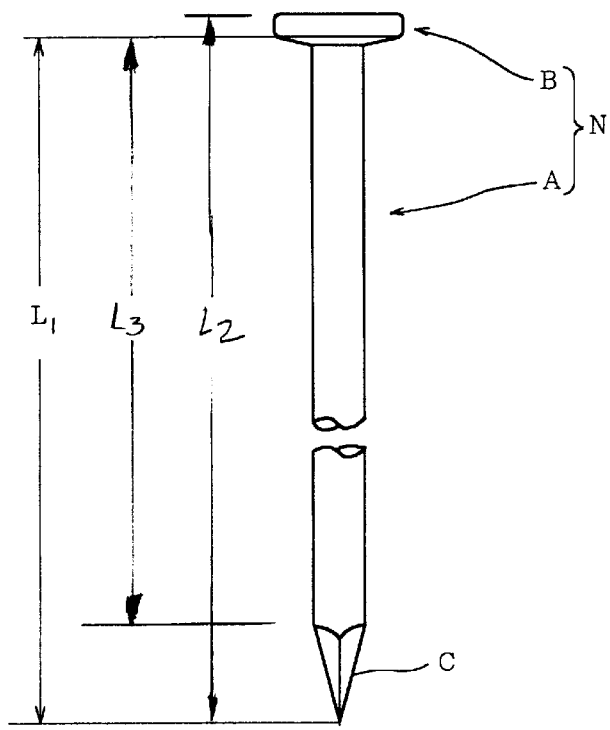
Fig. 2

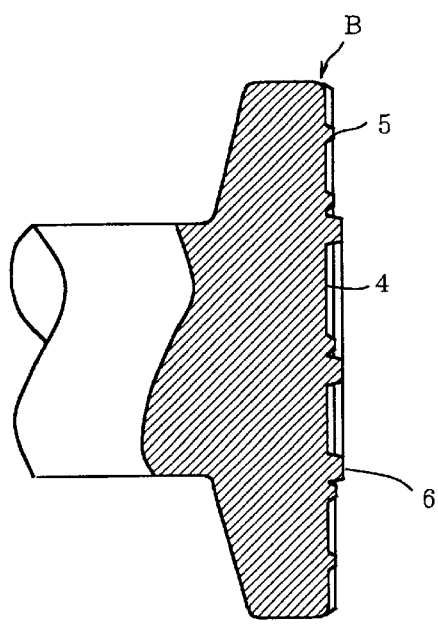
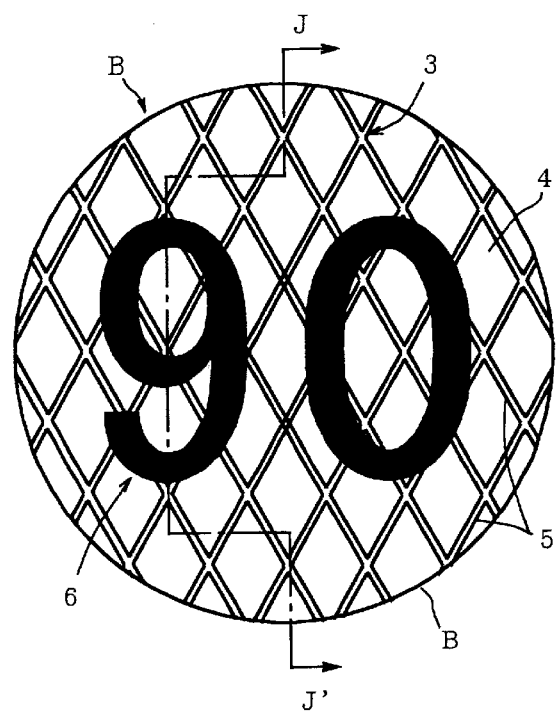
Fig. 3b       Fig. 3a
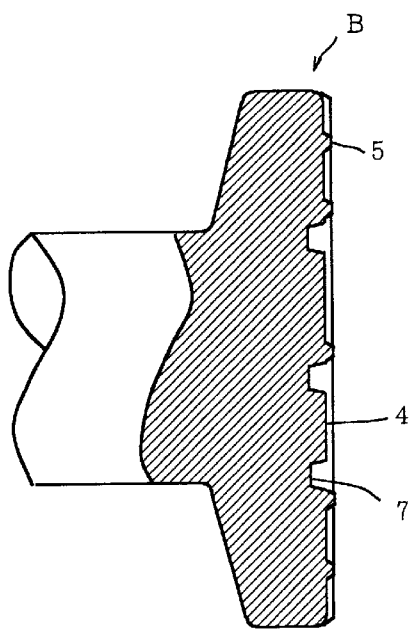
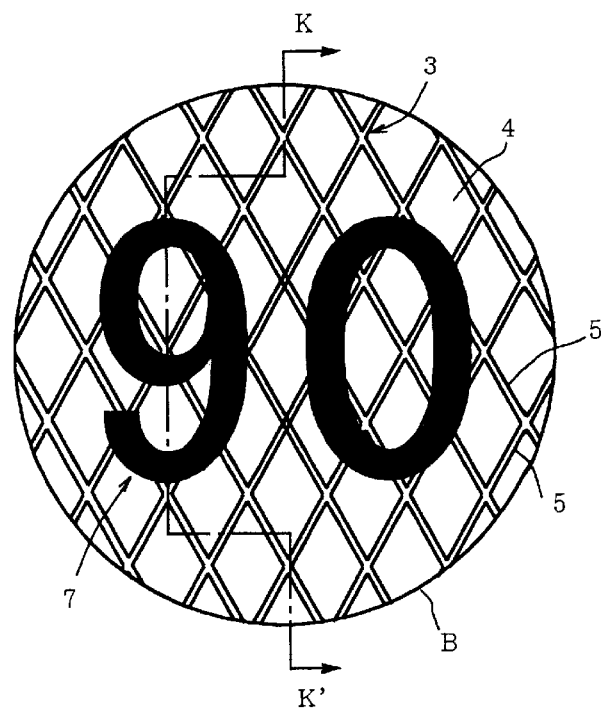
Fig. 4b       Fig. 4a

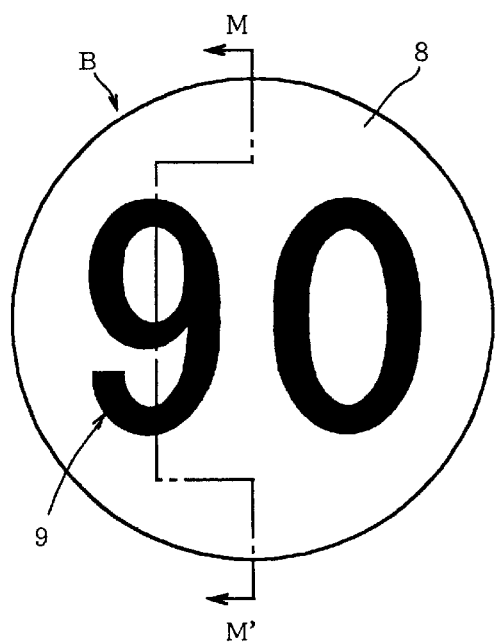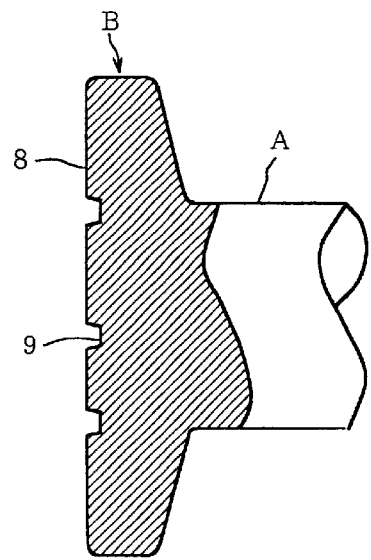
Fig. 5b    Fig. 5a
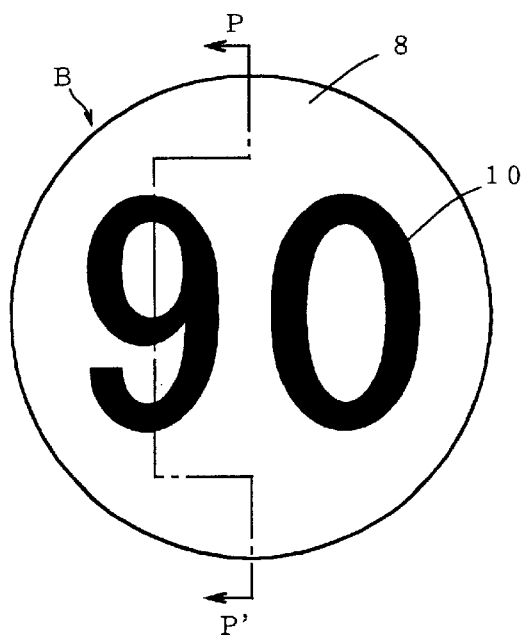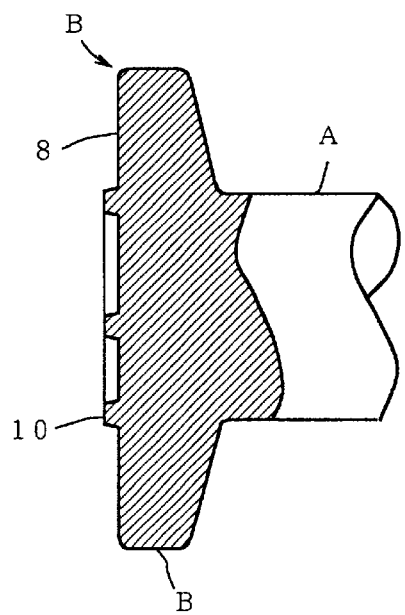
Fig. 6a    Fig. 6b

NAIL WITH LENGTH INDICATION

CROSS REFERENCES TO RELATED APPLICATIONS

This application claims priority of Japanese Patent Application No. 2001-22554, No. 2001-340898 filed in JPO on Jan. 31, 2001, Nov. 6, 2001, respectively, the entire disclosures of which are incorporated herein by reference.

BACKGROUND OF THE INVENTION

1. Field of the Invention

The present invention relates to nails as for use in building construction.

2. Description of the Related Art

According to conventional technology, the length of a nail has been indicated on a nail package, or a coloring has been applied to the head of the nail corresponding to each nail length. The length of a particular nail is determined by reference to a chart on the package identifying the color corresponding to each nail length. In Japanese Patent Application Laid-open Publication No. 11-210727, a nail is described in which the head portion or the entire surface is painted with a color corresponding to the length of the nail. Also, it is proposed that a table for determining the length of nails by the use of a series of different coding colors is printed on a nail package. Moreover, in Japanese Patent Application Laid-open Publication No. 7-27118, there is disclosed nails painted with the same color as that of the material into which the nails are driven, and in this case, it is disclosed that a contacting face between a nail head portion and an elastic resin layer of a nail is to be formed with raised or recessed contours so that a colored elastic resin layer of the head portion of the nail can be protected from being dislodged by the striking of the hammer.

If the nail length color code table is printed on the nail package, this has the disadvantage that after taking a nail out from the nail package to be put into a nail bag for carrying, its length can no longer be readily determined, and nails of incorrect length could be used. Moreover, for example, in residential building, a proper length nail to be used is specified by building codes. However, since there are many nails of approximately the same length having heads of similar appearance to one another, after a nail has been driven, the length of the nail used can not be checked by inspection of the completed construction.

In the case of nails with colored heads, their length can be confirmed after being driven, but a reference to a corresponding chart to confirm the nail length is necessary and the colored paint tends to come off after the nail head has been struck by a driving tool.

The object of the present invention is to provide a nail in which the nail length can be easily confirmed even after the nail has been driven.

SUMMARY OF THE INVENTION

According to the present invention, a nail with length indication is provided, in which the nail length is numerically or otherwise marked on the head of the nail.

Moreover, according to the present invention, the nail length is indicated with a numeral or other marking formed by either raised areas or recessed contours on the nail head.

In addition, the recessed areas of the head is colored so that the nails are also color coded as to length.

Moreover, the present invention may provide a nail having a checkered lattice pattern formed on the surface of the nail head and the numeral is formed within the checkered lattice pattern on the head.

The checkered lattice pattern is formed by raised ridges and comprises two groups of spaced straight-lines, of which several parallel straight-lines in each group are crossed with respect to the lines in the other group. The numeral is formed with a contour raised above the straight-lines of the checkered pattern formed on the head. At least the checkered lattice pattern has a coloring material applied of a particular color corresponding to the nail length.

The present invention also provides quantities of nails all of a particular length, in which each nail has a shank including a penetrating tip at one end and a head formed on the other end of the shank, and in which the length of each nail is numerically marked on the head of the nail, and nails of the same length and are colored with a particular color which is different for each nail quantity, in order to be distinguished from nails from other quantities as to length.

The whole surface of a shank and a head of a nail can be colored as with colored paint.

Since nail lengths are indicated on the head of nails, the length of the nails taken out from a nail package can be easily recognized without the use of a ruler or a separate chart. Also, the nail length can be confirmed at a glance, and it can be easily determined whether or not a nail of the proper length has been used after the nail has been driven.

Moreover, according to the present invention, since the nail length is indicated by a numeral formed by raised or lowered contouring of the nail head, the color coding is less likely to come off after striking with a hammer as the painted colors will be retained in recessed areas created by the raised or lowered contouring. Slipping of the hammer head can be prevented in the same manner as with conventional checkered lattice pattern.

In addition, the nail head contouring forming the numeral or other marking can be formed at the same time that the head of the nail is shaped by the nail making machine, so that the nail can be manufactured with a length indication without requiring an additional manufacturing step. Furthermore, according to the present invention, since the nail length is indicated by the combination of the raised or lowered contouring on the head and the coloring of the recessed areas, a user can easily read the nail length and errors in selecting a particular nail length are minimized. In addition, since the coloring is protected in the recessed areas, it is protected from being struck and dislodged by the hammer blows when the nail is driven.

BRIEF DESCRIPTION OF THE DRAWINGS

FIG. 1a is an enlarged end formed view showing the head of the nail with the length indication according to a first embodiment of the present invention.

FIG. 1a is a cross-sectional view taken along the line I–I' in FIG. 1.

FIG. 2 is an elevational view of the nail shown in FIG. 1.

FIG. 3a is an enlarged end view showing the head of a nail according to a second embodiment of the present invention with a numerically indicated length of 90 mm by raised contouring on the nail head.

FIG. 3b is a cross-sectional view taken along the line J–J' in FIG. 3a.

FIG. 4a is an enlarged end view of the head of a nail according to a third embodiment of the invention, in which the contouring on the head forming the numeral is recessed into the nail head.

FIG. 4b is a cross-sectional view taken along the line K–K' in FIG. 4a.

FIG. 5a is an enlarged partially sectional through a fragmentary portion of a nail view according to a fourth embodiment of the present invention along the line M–M' showing the recessed contouring of the head of the nail forming a length indicating numeral.

FIG. 5b is an end view of the nail shown in FIG. 5a.

FIG. 6a is an enlarged end view showing the head of a nail according to a fifth embodiment of the invention, of which the contouring forming the length indicating numeral is raised.

FIG. 6b is a cross-sectional view taken along the line N–N' in FIG. 6a.

DETAILED DESCRIPTION OF THE PREFERRED EMBODIMENTS

Figure 7:
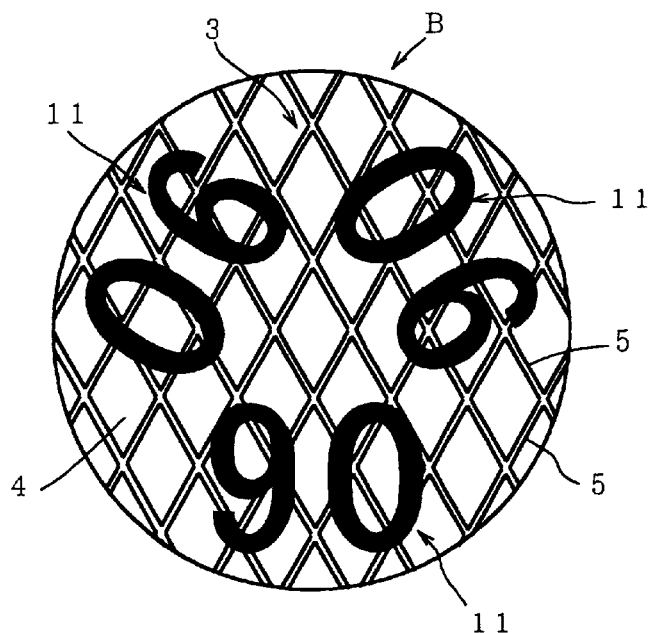
FIG. 7 is an enlarged end view showing the head of a length according to a sixth embodiment of the present invention.

Several embodiments of nails according to the present invention will now be described in detail in reference to the attached drawing Figures.

FIG. 1a is an enlarged plan view showing the head of the nail according to the first embodiment of the present invention. FIG. 1a is a cross-sectional view taken along the line I–I' in FIG. 1a. FIG. 2 is a front view of FIG. 1a. A length indicating nail N of the length L of the first embodiment is forged with a head B a one end of the shank A of the nail. A tip C with a shape such as a quadrangular pyramid is formed at the other edge of shank A. The surface of the head B is formed with a checkered lattice pattern 1 for preventing slipping of a hammer head off the head 2 when the nail is struck.

The nail length is measured in various ways, as shown in FIG. 2. The length L1 is the distance from the tip C to the end of the shank A. The length L2 is the distance from the tip C to the top of the head B. The length L3 is the length of the shank only. The present invention would indicate whatever length measuring convention is in use where the nails are being sold.

A numeric marking indicating the nail length L (measured by the appropriate convention) in millimeters is comprised of a numeral 2 formed by recessed contouring comprising a groove formed into the surface of the head B. A smooth area 2a extends around the numeral forming groove 2b. By forming the numeral 2 with a groove 2b, recessed below the smooth area 2a, the numeral 2 corresponding to the indicated nail length L can be easily read directly.

The checkered lattice pattern 1 is formed around an elliptical ridge 2d, which is formed by a raised contour on the head as is the checkered lattice pattern 1, in which the two groups of straight-line ridges 2c are raised above the smooth area 2a, straight line ridges 2c crossing each other. These straight-line ridges 2c are formed with a cross section of a trapezoidal or a semicircular shape. Automatic driving of nails connected together in a magazine by a nailer gun is generally used in the construction of a 2×4 house (platform wood frame construction).

A method for manufacturing the length indicating nail N by using a nail-making machine will be described briefly.

First, a wire rod which is the material for the nail is cut by a cutter to a length providing the volume of material necessary for the molding of the head B added to the length of the shank A. At the same time, the tip part C of the shank A is molded into a quadrangular pyramid form in correspondence to the form of the cutter. Next, the longitudinal part of the wire rod is clamped, the end part of the wire rod then punched by a punch to form the head B. The punch serves as a pattern for both the aforementioned checkered pattern 1 and the numeral 2 indicating the nail length L. Therefore, a numeric marking of the nail length L is created at the same time as the forming of the head B. The whole of the nail can be colored with a particular color corresponding to a given length in order to be color coded including the recessed areas on the head so that paint or other coloring will remain on the head after the nail head has been struck by a hammer when being driven.

FIGS. 3a, 3b show a second embodiment of the nail N of the present invention. FIG. 3a is the enlarged end view showing the head B of the nail N. FIG. 3b is the cross-sectional view taken along the line J–J' in FIG. 3a.

The shank part A is not shown in FIGS. 3a, 3b, but is the same as that shown in FIG. 2.

The nail N shown in FIG. 3a and 3b is formed, with a checkered lattice pattern 3 on the whole area of the surface of the head B. This checkered pattern 3 is formed by two groups of crossing straight-lines ridges 5 that are raised above the smooth area 4. The numeral 6, shown as indicating a nail length of 90 mm, is formed by raised contouring which is higher than the straight-line ridges 5. The checkered pattern 3 is formed by a crossing angle between the two groups of straight-line ridges 5 of 120°.

FIGS. 4a and 4b show a third embodiment, in which the contouring forming the numeral 7 differs from that of the length indicating nail N shown in FIG. 3a and 3b, i.e., the contouring is recessed rather than raised. FIG. 4a is an enlarged end view showing the head B of the nail N. FIG. 4b is a cross-sectional view taken along the line K–K' of FIG. 4a.

In this embodiment of the present invention, the checkered lattice pattern 3 is formed by two groups of crossing straight-lines ridges 5 raised above the smooth area 4, and the numeral 7 is formed by recessed contours lying within the checkered pattern 3, i.e., the numeral 7 formed by grooves formed into the smooth area 4 of the head B.

FIGS. 5a, 5b show a fourth embodiment of the length indicating nail N. FIG. 5b is an enlarged end view showing the head B of the nail. FIG. 5a is a cross-sectional view taken along the line M–M' in FIG. 5b.

The nail N shown in FIG. 5a and 5b has the head B formed with a smooth surface area 8. The length indicating numeral 9 is formed by a groove formed into the smooth surface area 8.

FIGS. 6a, 6b show a fifth embodiment of the nail according to the present invention, in which the length indicator numeral 10 is formed by raised contouring. FIG. 6a is an enlarged end view showing the head of the nail. FIG. 6b is a cross-sectional view taken along the line P–P' in FIG. 6a.

In this embodiment of the present invention, the surface of the head B is formed with a smooth surface area 8, in which the numeral is formed by contouring raised above the smooth area 8.

FIG. 7 shows a sixth embodiment of a nail according to the present invention, having a checkered pattern 3 formed on the surface of the head B. Three numerals 11 formed by grooves or raised contouring 11, are arranged to have a rotational symmetry around the center of the head B, separated by 120°.

In this embodiment of the present invention, since the numerals 11 are arranged around the center of the head B at 120° intervals, the numerals 11 may be read from any direction.

Figure 8:
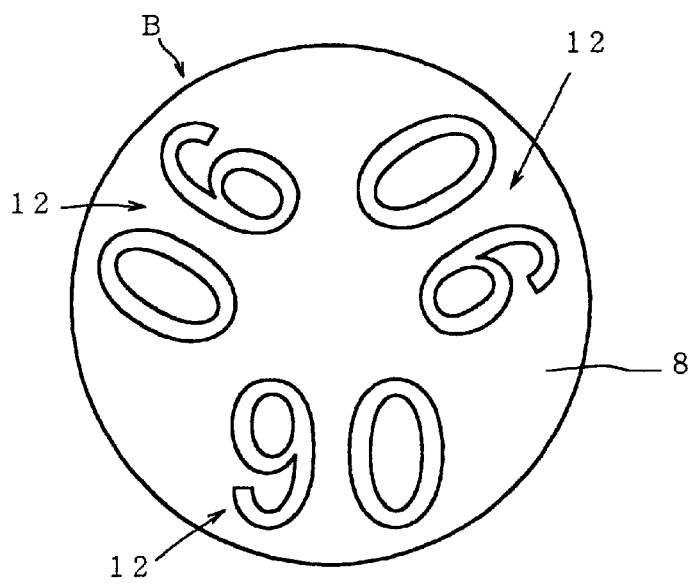
FIG. 8 is an enlarged end view showing the head of a nail according to a seventh embodiment of the present invention.

FIG. 8 shows a sixth embodiment of the nail according to the present invention, in which the surface of the head B is formed with a smooth surface area 8, as well as a length indicating numeral 12, formed by a raised contouring or with a recessed contouring in the smooth area 8. In this embodiment, numerals 12 are provided, each having a rotational symmetry with each other around the center of the head spaced apart by 120°.

Though the embodiments of the present invention described above, show by example a nail having a length of 90 mm, the invention is not limited to the length 90 mm, however, as such indicators may be used with nails of various lengths, such as 75 mm, 65 mm, 50 mm or 45 mm, and the numerals corresponding to the length of each such length are formed by contours on the nail head B.

For example, the whole surface of a nail N90 having a length of 90 mm is colored with the color purple; the whole surface of the nail N75 of a length of 75 mm is colored with the color yellow-green; the whole surface of the nail N65 of a length of 65 mm is colored with the color orange; the whole surface of the nail N50 of a length of 50 mm is colored with the color black; and the whole surface of the nail N45 of a length of 45 mm is not colored.

In this way, by color coding the nails with the use of different colors each corresponding to a nail length, in addition to marking the length of the nails with the numerals 2a, 6, 9 or 10 by raised or lowered contours on the head B on the head B, workers can easily take out a particular desired length nail N from a portable nail bag without error and can also check the length at a glance by noting the color of the head B either before or after the nail has been driven.

In the description mentioned above, a typical embodiment in which the length L of the nail is indicated with a raised or lowered contour. However, for example, there could be also embodiments, in which the numerals indicating the nail length L or the like is printed on the head B. Moreover, though an example in which length L of a nail is indicated by numerals is shown, as long as the workers can directly recognize the same, the length of a nail can be indicated with a marking comprised of any commonly used symbol, and moreover, the type of nail in addition to the nail length L can also be indicated.

What is claimed is:

1. A nail having a length indication comprising:
 a shank including a tip formed on one end of the shank; and
 a head formed on another end of the shank said head having a top surface bearing a numeric marking indicating the length of the nail;
 said numeric marking comprising a numeral formed by contouring on the nail head top surface, and,
 wherein a recessed surface is formed in said nail head by said numeric marking contouring and is coated with a coloring also corresponding to said numeric nail length indicator marking.

2. The length indicating nail according to claim 1, wherein the entire surface of the nail is coated by a coloring corresponding to said nail length.

3. A nail having a length indication comprising:
 a shank including a tip formed on one end of the shank;
 a head formed on another end of the shank;
 a checkered lattice pattern formed on a surface area of the head; and
 a marking within the checkered lattice pattern on the surface area of the head, indicating the length of the nail.

4. The nail according to claim 3, wherein said checkered lattice pattern is formed by two groups of several parallel raised straight-line ridges, of which several parallel straight-lines are spaced in one group and each straight-line of one group and each straight-line of another group are cross each other.

5. The nail according to claim 4, wherein said marking is provided by a numeral formed by contouring raised above said straight-line ridges forming said checkered lattice pattern on the head.

6. The nail according to claim 4, wherein said numeral marking is provided by a numeral formed by raised contouring lower than said straight-line ridges forming said checkered lattice pattern on said head.

7. The length indicating nail according to claim 4, wherein said checkered lattice pattern is colored with a color corresponding to said nail length indicating numeral.

8. A nail having a length indication comprising:
 a shank including a tip formed on one end of the shank;
 a round head formed on another end of the shank;
 a plurality of identical numerals, each formed on a top surface of the head and arranged above the perimeter of said round head, each numeral indicating the length of the nail.

9. The nail according to claim 8, wherein said numerals are each formed by a recessed contouring in the surface of the head.

10. The nail according to claim 8, wherein said numerals are formed by a raised contouring on the surface of the head.

11. A grouping of quantities of nails, all of the nails in each quantity of the same length but of a different length than the nails in the other quantities, wherein each nail in each collection is color coded with the same color different from the color of the nails in the other collections, and each nail comprises:
 a shank including a tip formed on one end of the shank; and
 a head formed on another end of the shank having a top surface;
 a numeric marking on each nail head top surface formed by a contouring thereof forming a recessed area;
 and wherein said color coding is applied to said recessed area on said head top surface of each nail.

12. The grouping of quantities of nails according to claim 11, wherein the whole surface of said shank and head of each nail is colored with a color coding.

* * * * *